Nov. 3, 1970
J. C. JUBIN, JR., ET AL  3,537,818
PURIFICATION OF HYDROGEN CHLORIDE PRODUCED BY
THE CHLORINATION OF PARAFFIN HYDROCARBONS
Filed Oct. 22, 1968
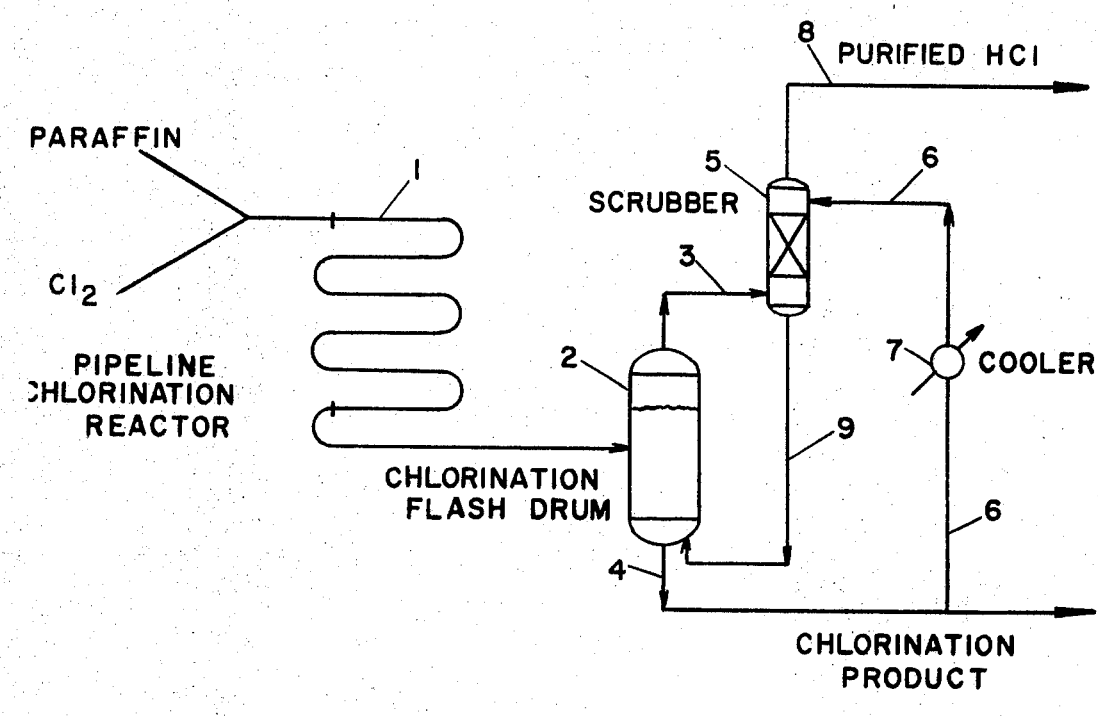
INVENTORS
JOHN C. JUBIN, JR.
MATTHEW L. BECKER,
BY
Robert K. Cochran
ATTORNEY

United States Patent Office 3,537,818
Patented Nov. 3, 1970

3,537,818
PURIFICATION OF HYDROGEN CHLORIDE PRODUCED BY THE CHLORINATION OF PARAFFIN HYDROCARBONS
John C. Jubin, Jr., Wallingford, and Matthew L. Becker, Philadelphia, Pa., assignors to Atlantic Richfield Company, Philadelphia, Pa., a corporation of Pennsylvania
Filed Oct. 22, 1968, Ser. No. 769,484
Int. Cl. C01b 7/08
U.S. Cl. 23—154
1 Claim

ABSTRACT OF THE DISCLOSURE

The hydrogen chloride gas produced as a by-product in the chlorination of paraffins is purified by scrubbing the gas with a portion of the chlorination product.

BACKGROUND OF THE INVENTION

Field of the invention

This invention relates to a method for the purification of gaseous hydrogen chloride produced as a by-product in the chlorination of paraffins by scrubbing the gas with a portion of the chlorination product to remove chlorine therefrom.

Prior art

In the commercial chlorination of n-paraffins the quality of chlorine utilized is somewhat variable resulting in reactivity which is also variable. Moreover, it is not always possible to control the chlorination reaction so that all of the chlorine introduced into the reaction is utilized. The by-product hydrogen chloride resulting from the chlorination, therefore, contains amounts of chlorine which can vary rather widely for example, from 1 or 2 parts per million to several thousand parts per million, depending upon the completeness of the reaction. When the chlorine content is above about 500 parts per million the condition is described as chlorine "break-through." Since the hydrogen chloride is a valuable by-product it is necessary to recover it in as completely a pure condition as is possible in order that it can be utilized either for making hydrochloric acid or in chemical reactions.

No prior art is known which shows the process of the instant invention for purifying hydrogen chloride made as a by-product from a paraffin chlorination process.

SUMMARY OF THE INVENTION

The present invention provides a method for purifying hydrogen chloride produced as a by-product from the chlorination of straight chain paraffin hydrocarbons by scrubbing the hydrogen chloride gas separated from the chlorination product with a portion of the chlorination product to remove chlorine therefrom.

It is an object of this invention therefore to provide a method for the removal of chlorine from the hydrogen chloride by-product of a paraffin chlorination reaction by scrubbing the hydrogen chloride with a portion of the chlorination product.

Other objects of this invention will be apparent from the description of the preferred embodiments which follow and from the claims.

DESCRIPTION OF THE PREFERRED EMBODIMENTS

In one method for the commercial preparation of detergents, straight chain paraffin hydrocarbons in the range of from 9 to 18 carbon atoms and preferably from 10 to 14 carbon atoms are monochlorinated thermally to give a mixture consisting of about 80 weight percent unreacted paraffins and 20 weight percent chlorinated paraffins, the latter consisting of 90 percent or more monochlorinated paraffins. This mixture contains hydrogen chloride produced as a by-product from the reaction together with small amounts of chlorine. The hydrogen chloride and chlorine are separated in a flash drum.

The chlorinated paraffins in admixture with the unreacted paraffins are thereafter used to alkylate benzene and the alkylated benzene after sulfonation and neutralization is finished as the detergent. It is the hydrogen chloride separated from the chlorinated product with which this invention is concerned. It will be understood, of course, that the invention is also applicable to any paraffin chlorination process wherein high conversions are obtained, for example, 40 to 50 percent or higher and wherein the polychloride content is correspondingly high.

In a preferred embodiment of this invention a scrubbing tower is placed above the chlorination flash drum and piping is provided so that the effluent hydrogen chloride stream from the flash drum which may contain up to several thousand parts per million chlorine is scrubbed countercurrently with cold (e.g. 80° F. to 150° F.) chlorination reaction products. The hydrogen chloride stream is thus cooled from a chlorination temperature of, for example, 280° F. to 320° F. to a temperature only a few degrees above the temperature of the cold scrubbing liquid. The scrubbing liquid after contacting the hydrogen chloride is returned to the bottom of the chlorination flash drum. The flows are adjusted so that the temperature at the bottom of the scrubber is maintained hot, that is, at about 2400 F. to 300° F. and the chlorine content of the hydrogen chloride stream is reduced to a negligible amount by chemical reaction with the normal paraffins and chloroparaffins in the bottom of the scrubber. The scrubber serves two functions: The first being as a quench tower or direct contact condenser and the second as a final reactor step to remove the last traces of chlorine in the hydrogen chloride stream. The scrubber also can function in another manner; namely, as a safety device since in the case of a severe chlorine "break-through" where the hydrogen chloride gas could have from 5 to 10 percent chlorine in it, a very unsafe condition, the presence of this scrubbing tower provides a completion of the chemical reaction and avoids vapor space hot spots.

The scrubbing tower is usually operated at essentially atmospheric pressure or slightly above, i.e. at about 5 p.s.i.g. in order to provide positive pressure flows, and sometimes at higher pressure since there is no inherent process reason to keep the pressure always at 5 p.s.i.g.

The amount (weight) of chlorination product used in the scrubber preferably ranges from 2 to 3 times the weight of the hydrogen chloride effluent, since the amount of scrubbing medium is a function of the amount of hydrogen chloride effluent. The amount of scrubbing medium is not extremely critical, however, but should be sufficient to give the results in accordance with those desired as set forth.

As an additional description of the invention reference is made to the drawing wherein a chlorination paraffin reactor, chlorination flash drum, scrubber and attendant piping is shown as a schematic diagram. In this drawing the normal paraffins and chlorine enter a conventional pipe reactor 1, wherein the chlorination reaction is carried out converting a portion of the paraffins to chloroparaffins. The chlorination product is passed into the chlorination flash drum 2, wherein the hydrogen chloride gas together with unreacted chlorine is removed from the top of the drum through line 3, and the chlorination product is removed from the bottom of the drum through line 4. The effluent hydrogen chloride vapor is passed into the bottom of a scrubber 5, where it is countercurrently contacted with a portion of the chlorination product which has been diverted from line 4 through line 6 through cooler 7 and into the top of the scrubber tower. The purified hydrogen chloride gas containing substantially no chlorine is removed from the top of scrubber tower 5 by means of line 8. The scrubbing liquid which has contacted the hydrogen chloride vapor is removed from the bottom of the scrubbing tower through line 9 and returned to the bottom of the chlorination flash drum.

The following example is provided to illustrate the utility and a specific embodiment of the invention, but is not to be construed as limiting.

EXAMPLE

In a commrecial alkyl aryl sulfonate detergent plant straight chain paraffins in the $C_{10}$ to $C_{14}$ range were chlorinated in a pipe reactor and the effluent from the reactor was passed into a flash drum. A scrubbing tower was placed above the flash drum and provided with piping so that the hydrogen chloride vapor entered the bottom of the tower at a temperature of between 280° F. and 320° F. depending upon the reaction temperature being employed in the chlorination reactor and on the temperature and quantity of cold chlorinator effluent liquid used for scrubbing. A portion of the chlorination reaction product removed from the bottom of the chlorination flash drum was passed through a cooler where it was cooled to between 90° F. and 140° F., and thereafter introduced into the top of the scrubbing tower. The amount of chlorination product was 2.6 times the weight of the hydrogen chloride effluent from the flash drum. This cold chlorination reaction product was passed downwardly through the scrubbing tower in countercurrent contact with the hot hydrogen chloride vapors from the flash drum. The flows were adjusted so that scrubbing stream leaving the bottom of the scrubbing tower were at a temperature of about 260° F. to 300° F. This scrubbing liquid was thereafter passed into the bottom of the chlorination flash drum. It was found that the hydrogen chloride removed from the top of the scrubbing tower had a zero p.p.m. chlorine content, thus demonstrating the utility of the process of this invention.

As many possible embodiments can be made of this invention without departing from the broad scope thereof, it is to be understood that all matter herein set forth is to be interpreted as illustrative and not as unduly limiting the invention.

We claim:
1. A method for removing chlorine from a chlorine-containing hydrogen chloride gas stream produced as a by-product in the chlorination of straight chain paraffins having from 10 to 14 carbon atoms in the molecule which comprises countercurrently contacting the hydrogen chloride gas stream which is at a temperature in the range of from 280° F. to 320° F. solely with a portion of the chlorination product which has been cooled to a temperature in the range of from 80° F. to 150° F. and which is from 2 to 3 times the weight of the hydrogen chloride effluent gas stream being treated and separating the hydrogen chloride freed of chlorine from the scrubbing liquid.

References Cited
UNITED STATES PATENTS

| | | | |
|---|---|---|---|
| 2,137,095 | 11/1938 | Peck | 23—154 |
| 2,402,978 | 7/1946 | Allen et al. | 23—154 |
| 2,841,243 | 7/1958 | Hooker et al. | 23—154 XR |
| 3,242,647 | 3/1966 | Alkemade et al. | 23—154 XR |
| 3,356,749 | 12/1967 | Van Dijk | 23—154 XR |
| 3,445,533 | 5/1969 | Mottern | 23—154 XR |

EDWARD STERN, Primary Examiner

U.S. Cl. X.R.

23—219